(No Model.) 5 Sheets—Sheet 2.
W. M. GREEN & F. W. SMITH.
MAGIC LANTERN.
No. 595,165. Patented Dec. 7, 1897.
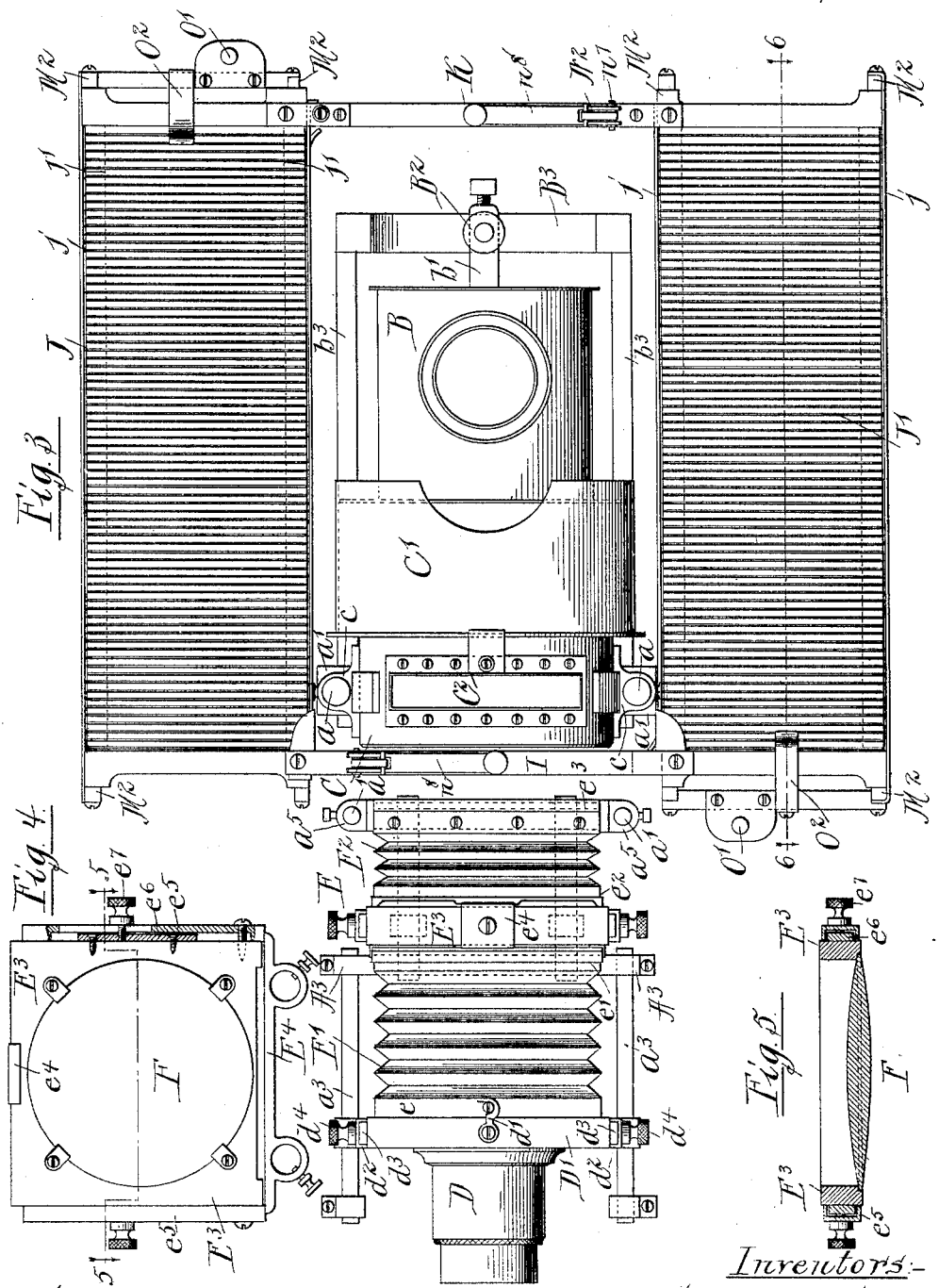

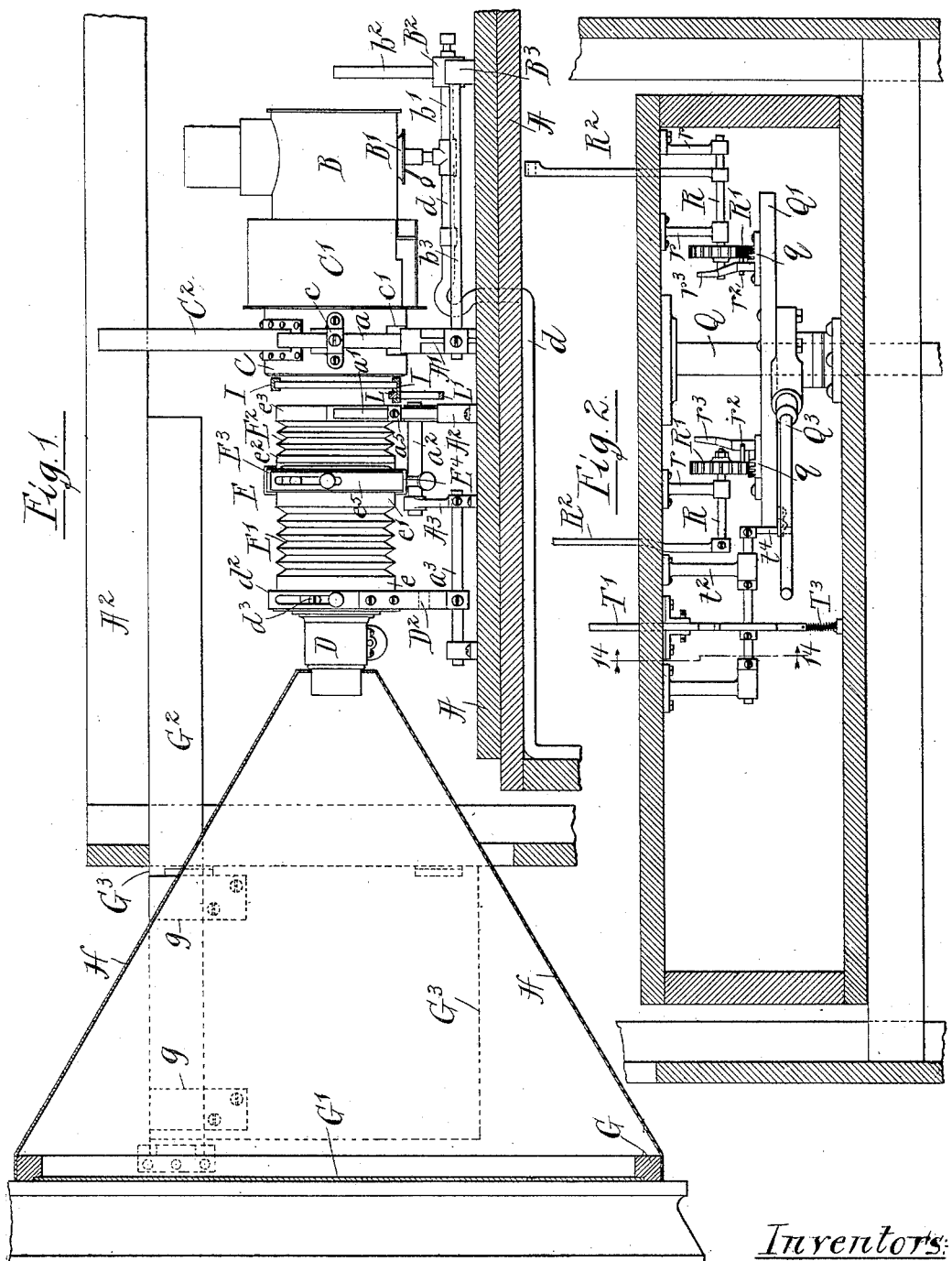

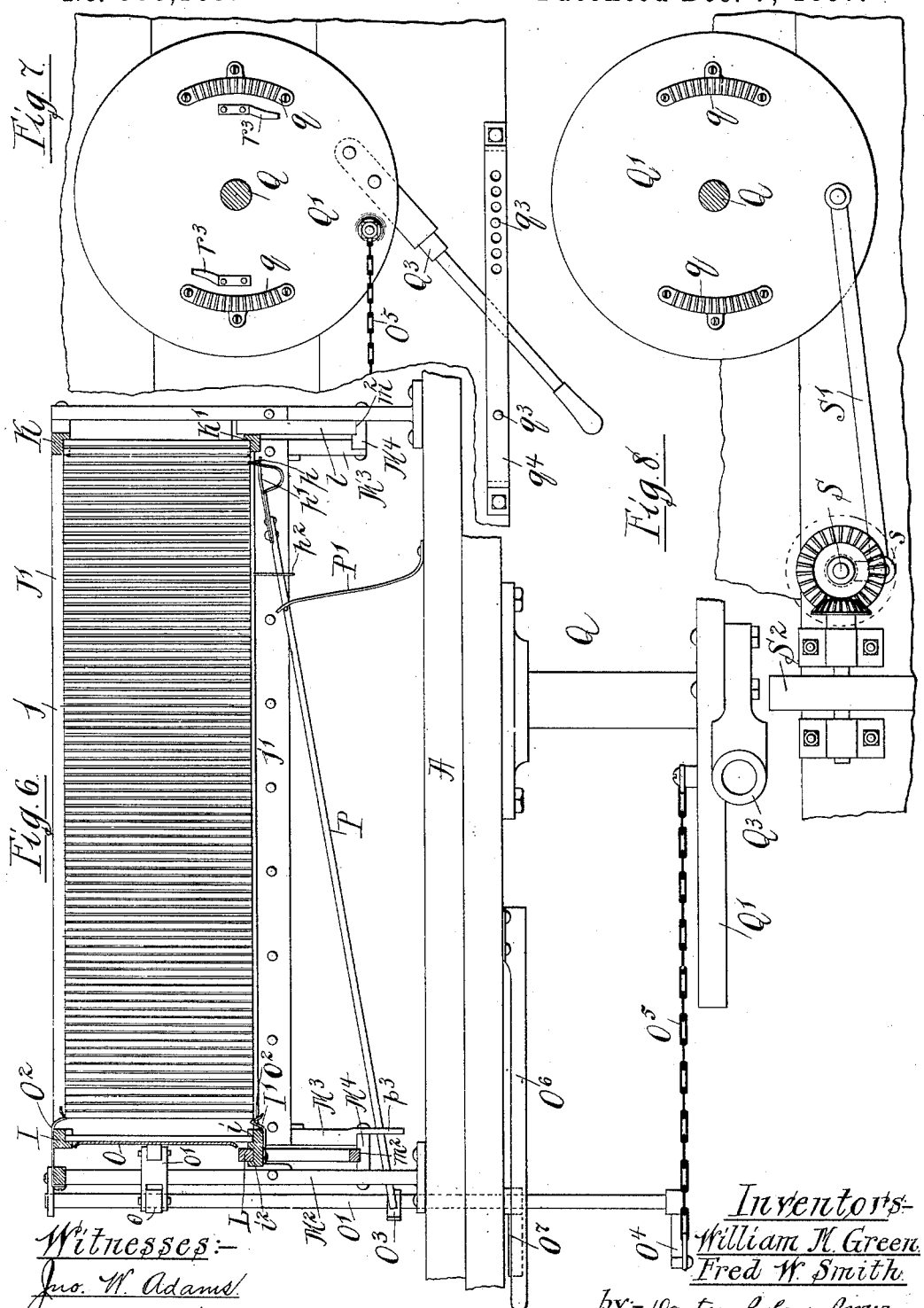

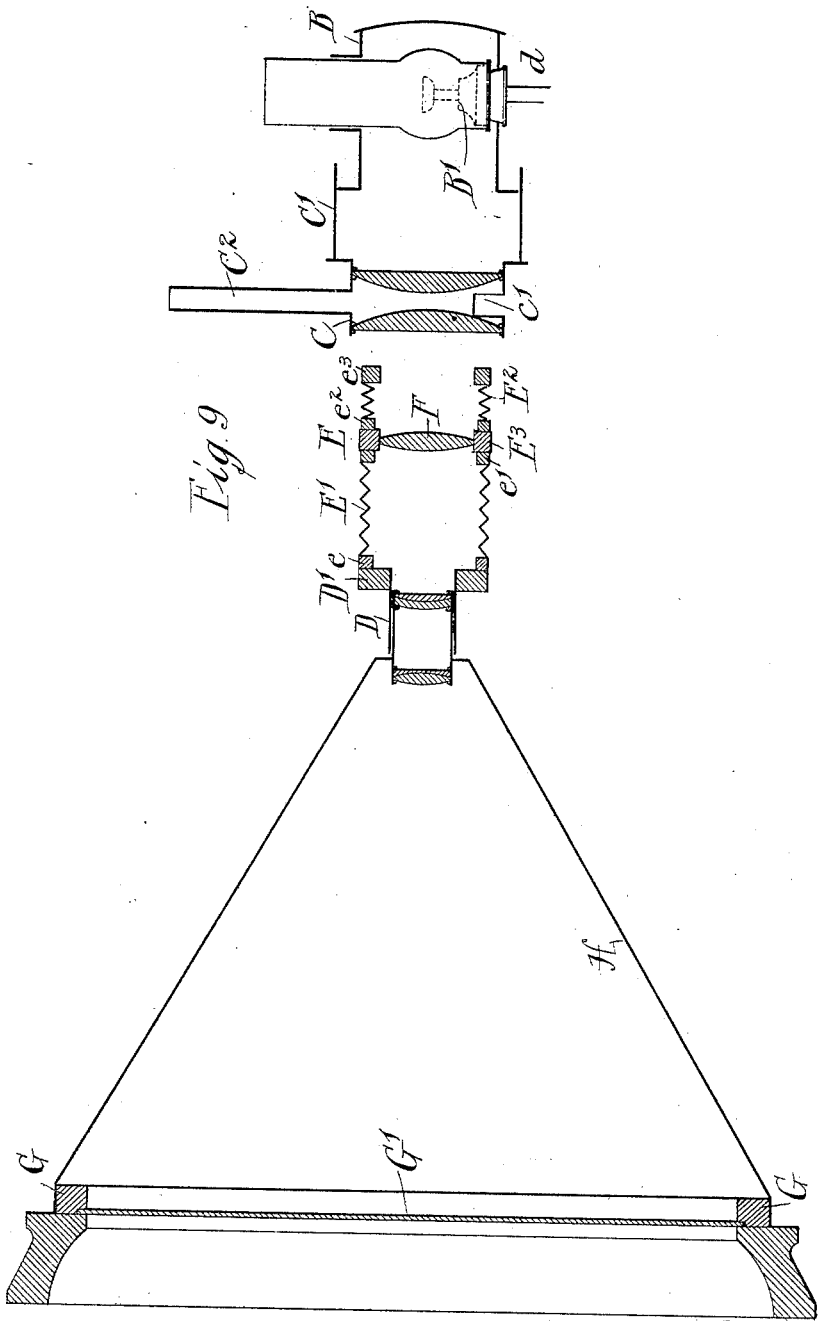

(No Model.) 5 Sheets—Sheet 5.
W. M. GREEN & F. W. SMITH.
MAGIC LANTERN.
No. 595,165. Patented Dec. 7, 1897.
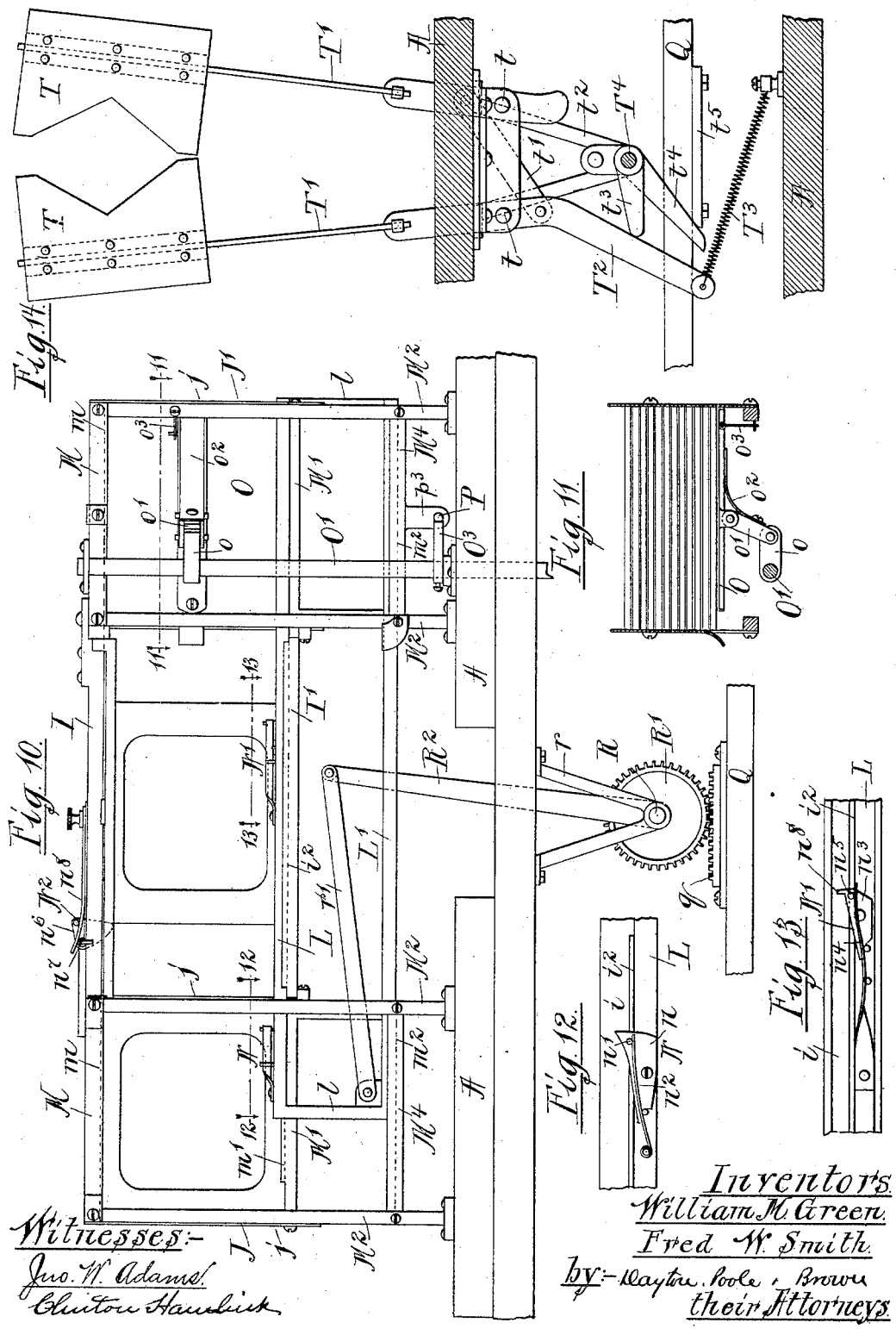
Witnesses:
Jno. W. Adams
Clinton Hambrick
Inventors
William M. Green
Fred W. Smith
by:— Dayton, Poole, Brown
their Attorneys

United States Patent Office.

WILLIAM M. GREEN, OF EVANSTON, AND FRED W. SMITH, OF CHICAGO, ILLINOIS.

MAGIC LANTERN.

SPECIFICATION forming part of Letters Patent No. 595,165, dated December 7, 1897.

Application filed January 21, 1895. Serial No. 535,687. (No model.)

*To all whom it may concern:*

Be it known that we, WILLIAM M. GREEN, of Evanston, and FRED W. SMITH, of Chicago, in the county of Cook, State of Illinois, have invented certain new and useful Improvements in Magic Lanterns; and we do hereby declare that the following is a full, clear, and exact description thereof, reference being had to the accompanying drawings, and to the letters of reference marked thereon, which form a part of this specification.

This invention relates to projecting or optical lanterns commonly known as "magic lanterns," and it embraces the features of construction both in the construction of the optical features of the lantern and in the mechanical devices by which the transparent slips or slides bearing the pictures to be projected are supplied to the lantern.

The invention consists in the matters hereinafter described, and pointed out in the appended claims.

In the accompanying drawings, which illustrate our invention, Figure 1 is a view in side elevation of the lantern proper, the feeding devices and other parts being shown in section. Fig. 2 is a view in side elevation of the actuating devices which are located below the base-board on which the lantern rests, the said base-board and adjacent framework being shown in section. Fig. 3 is a plan view of the lantern, the slide holders or magazines, and those parts of the actuating devices for the slides which are located above said base-board. Fig. 4 is a view in side elevation of the holding-frame of the magnifying-lens. Fig. 5 is a cross-section taken on line 5 5 of Fig. 4. Fig. 6 is a view in vertical section, taken on line 6 6 of Fig. 3, of one of the slide holders or magazines and devices for actuating the slides, showing the parts of said devices both above and below the base-board. Fig. 7 is a plan view of parts of the actuating devices below the said base-board. Fig. 8 is a plan view of the same parts when modified in construction to admit of their being driven by a motor. Fig. 9 is a diagram representing the arrangement of lenses in the lantern. Fig. 10 is a view in rear elevation of the slide holders or magazines and devices for actuating the slides. Fig. 11 is a detail plan section taken on line 11 11 of Fig. 10. Fig. 12 is a detail plan section taken on line 12 12 of Fig. 10. Fig. 13 is a similar section taken on line 13 13 of Fig. 10. Fig. 14 is a view in side elevation of a closing device or shutter and means for actuating the same.

The several parts of the apparatus herein shown as embodying our invention are constructed as follows:

To first refer to the features of construction in the lantern proper, or, in other words, in the illuminating device, the lenses, and means for supporting and inclosing the same, these parts are made as follows:

A indicates the base-board, on which the several parts of the lantern are mounted.

B indicates the casing or housing of the lamp or light. The means for supplying light illustrated consists of a gas-burner B', supplied by means of a pipe $d$.

C indicates the tube which supports the condensing-lenses, and C' the housing or inclosure connecting the same with the lamp-housing B.

D indicates the tube, in which is mounted the magnifying or objective lenses, and E indicates as a whole a tubular inclosure extending between the condensing-lenses and the magnifying-lenses, said inclosure consisting of two longitudinally expansible and contractible parts or bellows-sections E' E², which are in this instance made of flexible material or with bellows folds and attached at their ends to rectangular frames $e\ e'\ e^2\ e^3$, of which the frames $e\ e'$ constitute the ends of the section E' and the frames $e^2\ e^3$ constitute the ends of the section E². Between the sections E' and E² is inserted a rectangular frame E³, in which is supported a magnifying-lens F, Figs. 4 and 5, of double-convex form. The rectangular frames $e'$ and $e^2$ of the bellows-sections are secured to opposite faces of the frame E³ conveniently by means of a clip $e^4$, which is attached to the said frame and engages metal flanges on the said frames $e'\ e^2$ in the manner illustrated. The tube D for the object-lenses is attached to a frame D', to which the bellows-frame $e$ at the outer end of the section E' is attached, preferably, by means of a hook $d'$, Fig. 3. The purpose of the expansible or bellows sections is to enable the lens F to be adjusted toward and from the condensing or object lenses as required for obtaining an image or "field" of a desired size.

The tube C, which supports the condensing-lenses, is sustained by an attachment at its side edges to uprights $a\,a$, as herein shown, consisting of vertical guide-rods secured in a base piece or casting A', which is immediately attached to the base-board. Said tube C is shown as provided at its sides with sockets $c$, through which the uprights $a\,a$ are inserted, and which are provided with said set-screws to clamp the standards and hold the same from movement within the sockets. The bellows-frame $e^3$, the same being that nearest the condensing-lenses, is similarly supported by standards $a'\,a'$, which are secured in a base-casting $A^2$, attached to the base-board, said bellows-frame being provided at its sides with projecting lugs $a^5$, having apertures for the passage of the standards $a'$ and having set-screws inserted through the lugs to adjustably secure the frame on the standards, as clearly shown in the drawings. The frame $E^3$ is supported by means of a transversely-arranged yoke $F^4$, which is mounted to slide on horizontal guide-rods $a^2$ and to which the said frame $E^3$ is connected by means of affording vertical adjustment of said frame, the devices herein shown for this purpose consisting of channel-bars $e^5$, attached at their lower ends to the said lug and extending upwardly at the sides of the frame, and metal strips $e^6$, secured to the sides of the frame and sliding in the grooves of the channel-bars, set-screws $e^7$ being inserted through vertical slots in the channel-bars and engaging said metal strips $e^6$ to adjustably hold the frame in position. The guide-rods $a^2$ are shown as supported at one end in the casting $A^2$ and at their opposite ends in a casting $A^3$, also attached to the base-board. The frame D', which supports the object-lens tube, is similarly sustained by means of a transversely-arranged yoke $D^2$, similar to the yoke $E^4$, and which has sliding engagement with two horizontal stationary guide-rods $a^3$. To said yoke $E^4$ are attached channel-bars $d^2$, which are adjustably connected with the said frame D' by means of metal strips $d^3$, which engage the grooves of the channel-bars and to which the latter are clamped by means of set-screws $d^4$ in the same manner as before described in connection with the frame $E^3$.

Horizontal adjustment of the yoke $E^4$ in the guide-rods $a^2$ enables the distance of the magnifying-lens from the condensing-lenses to be changed as desired, and the sliding connection of the yoke $D^2$ with the guide-rods $a^3$ similarly permits adjustment of the object-lens tube relatively to the other parts of the lantern.

The tube C, which contains the condensing-lenses, is provided with an opening in its top between the lenses, and to said tube is attached a narrow upright tube or chimney $C^2$, which forms a ventilating stack or chimney. At the bottom of the tube C is formed an inlet-opening $d'$, by which the air may enter freely between the lenses, thereby tending to keep them cool and lessening the liability of breakage.

In order to afford adjustment of the gas-burner B' relatively to the condensing-lenses, said burner is attached by an arm $b'$ to a vertically-sliding socket piece or block $B^2$, which is mounted on a vertical guide-rod $b^2$, attached to a transverse supporting-bar $B^3$. Said bar $B^3$ rests at its ends on the base-board and is held in position and made adjustable horizontally by means of two horizontal rods $b^3$, attached to the end of the bar and passing through guide-apertures in the casting A'. A set-screw in the block $B^2$ enables the burner to be held at a desired height, while the set-screws in the casting A' enable the rods $b^3$ to be clamped and held from longitudinal movement, so as to maintain the burner at any distance desired from the condensing-lenses.

G is an open frame of wood which is supported in front of the lantern in a plane perpendicular to the central lantern and in which is secured a screen D', of ground glass or other suitable semitransparent or translucent material. Extending between the tube of the object-glass and the said frame G is a housing or inclosure H, which fits closely around the object-glass tube. As herein shown, said housing or inclosure is made of conical form and provided at its end adjacent to the said tube with an aperture large enough for the insertion of said tube, this construction giving the desired result with a minimum of size and weight in the parts. The inclosure H is preferably made white on its inner surface to prevent absorption of the light and to give a reflecting-surface, tending to throw the light outwardly through the screen. The housing H may be made of any suitable material, but is preferably constructed of sheet metal, strawboard, or other substance affording lightness combined with the requisite strength.

In the particular construction of the parts herein shown the frame G is supported by means of bars $G^2\,G^2$, which are attached to the said frame and adapted for detachable engagement with the frame $A^2$ of the casing or housing which supports the lantern and of which the base-board A forms a part. Said bars $G^2$ are shown as supported by means of brackets $g\,g$, attached to the inner sides of hinged doors $G^3$, which are adapted to close the front opening of the main casing or housing when the apparatus is not in use. The intention is that the frame G and its attached housing or cone H be disengaged from the other parts of the apparatus, except at the time the same is in use, thereby promoting convenience in transportation and storage, the bars $G^2$ being detachably secured to the said frame G, so that the parts may be packed in compact form after being disengaged from the main housing.

The employment of the double-convex lens F between the condensing and object lenses of the lantern constitutes an important and valuable part of our invention, for the reason that the use of such lens makes it possible to make a picture of large size at a short distance from the lantern which is sharp and perfect in every respect, free from distortion or spherical aberration, and perfectly achromatic. To produce these results, the said lens F is made of relatively large size—that is to say, larger than the field or picture on the slide—and said lens is an ordinary or simple biconvex lens and is not achromatic. Furthermore, the lenses constituting the objective are fixed or non-adjustable relatively to each other, so that said lenses always remain at the fixed distance apart determined on by the optician as necessary for their proper coaction, and the adjustment for giving a picture of the desired size is produced by moving the objective as a whole relatively to the double-convex lens or moving both the objective and double-convex lenses relatively to the condenser. The essential operative parts of our structure therefore consist of a light, condensers, picture, intermediate lens, and an objective of two elements fixed relatively to each other, but adjustable relatively to the condensers. The object of this combination of parts is to produce a perfect image of the largest possible size upon a screen located at a fixed distance from the lantern, and this result is produced by the use of the large adjustable double-convex lens by which the image is enlarged without distortion or diminution of clearness. The effect of the said double-convex lens is primarily to converge the rays bearing the image, thereby in effect moving back the focal point between the rear and front objectives and giving greater divergence to the rays passing from the front objective. Adjustment of the double-convex lens therefore makes the focal point between the two objectives variable, notwithstanding the fact that the two lenses are fixed relatively to each other.

Another result obtained by the use of a double-convex lens in the manner described is that better illumination of the image is obtained. In other words, the double-convex lens to some extent serves the purpose of the condensing-lenses by concentrating the light which passes through the slide from the condensers. This may be better understood from the following: Our desire is to shorten the distance between the front objective and the screen or "screen distance." Heretofore the screen distance has been shortened by the use of a more convex lens or one known as a "wide angle." The use of a lens of this kind is limited, however, because the screen distance cannot be shortened beyond a certain limit without destroying or affecting the clearness of the image projected. This arises from the fact that if a lens of very wide angle be employed with ordinary condensers giving parallel rays by reason of the smallness of the lens the great divergence of rays beyond the focal point and from the fact that the light is spread over so great a surface that the amount of light available will be entirely inadequate. It therefore becomes necessary in order to secure proper sharpness of the image to make a greater quantity of light pass through the objective lenses. This we accomplish by employing the biconvex lens, because with this we obtain with an objective of usual angle all the benefit of an excessively wide angle without the disadvantage of spherical aberration and at the same time secure the concentration of light in quantity more than enough to compensate for "scattering" the light or its diffusion over a larger field.

Another advantage gained by the use of the biconvex lens in connection with an ordinary objective for giving a large image at short distance is that it flattens the image and thereby prevents blurring at the edges resulting from spherical aberration.

Referring again to the undesirability of using objectives of wide angle to secure a short screen distance, it is well known that such lens when so used will not only make an image blurred or indistinct at it its edges, but with a curved field. When the lens is made achromatic, its refractive power is limited, or, in other words, such a lens cannot be used to give great divergence of rays and a correspondingly short screen distance. By the use of the biconvex lens interposed between the slide and the objective, as described, we are able to produce with an achromatic objective a perfectly flat and uniformly sharp image at an excessively wide angle, thereby obtaining results impossible to be obtained by the use of achromatic or wide-angled objectives.

By the use of the biconvex lens, as described, not only is the screen distance shortened, but also the distance between the objective and the picture or slide, the objective being placed nearer to the slide when such a lens is interposed. Similarly the use of the biconvex lens enables pictures of variable sizes to be used, this being impossible, except within very narrow ranges, with ordinary objectives which are prepared for use with slides of fixed and uniform dimensions.

The use of a double-convex lens arranged and operating, as described, in itself constitutes an important and valuable improvement, inasmuch as the same enables a perfect image to be produced when the lantern is located much nearer the screen than it has been heretofore practicable to place it.

The employment of a translucent or semi-transparent screen located near the object-lenses, combined with a double-convex lens, also constitutes a separate and valuable part of our invention, for the reason that this construction enables the image cast by the lantern to be seen by observers at the side of the screen remote from the lantern without requiring great space for the apparatus, it having been heretofore necessary to locate the lantern at the same side of the screen as the spectators by reason of the great amount of space required between the lantern and the screen.

We have found that an apparatus embracing in connection with condensing and object lenses and an intermediate magnifying-lens F of double-convex shape, such as described, a translucent screen G' and a housing or inclosure extending between the screen and the object-lens may be employed successfully for the showing of pictures by daylight or diffused artificial light as well as at night or in the dark, or, in other words, that pictures produced by the lantern on the screen G' may be seen in the presence of diffused light practically as well as when the apparatus is placed in a dark room or compartment.

By making the inner surface of the inclosure or housing H white in color absorption of light is prevented, and the picture projected on the screen is more clear and sharp. By the use of the double-convex lens F a greater divergence of the rays proceeding from the magnifying-lenses is secured, as above set forth, so that the image projected may be as large as the screen G', notwithstanding said screen is placed near the lantern and the inclosure H is relatively short. In other words, the use of said double-convex lens makes it practicable to place the screen close to the lantern and to provide the inclosure H without making the apparatus of unduly large size or requiring that it should occupy great space, so that the entire device, including the screen and housing, may be mounted on a supporting-framework of moderate size, such as that shown in the drawings. In fact, the apparatus constructed as illustrated may be set up in any ordinary apartment or even in a store-window without occupying an undue amount of space and is so compact and occupies so little room that it may be readily placed at one side or corner of an apartment of ordinary size, so that persons therein can readily observe the front or outer surface of the screen. In this respect the apparatus described differs from similar devices in which the image is projected on a screen located at a distance from the lantern and is viewed by persons standing at the same side of the screen as that at which the lantern is located.

By making the two sections E' E² of the tube E with bellows folds or otherwise expansible and contractible, as by telescopic or sliding parts at opposite sides of the magnifying-lenses F, said magnifying-lens may be moved or shifted toward and from the object-lenses, as may be found to be necessary to make a picture of the desired size, the picture being focused in the usual manner by shifting forward or back the tube which contains the relatively fixed object-lenses.

To now refer to the devices by which the pictures or slides are supported in operative position and fed to the lantern, these parts are constructed as follows:

I and I' indicate two horizontal parallel guide-bars forming guideways for lantern-slides, which extend across the lantern or intersect its optical axis between the condensing-lens tube C and the adjacent end of the tube E and which are provided with guide-grooves in their adjacent faces to receive the upper and lower edges of the slides.

At either side of the body of the lantern are located two picture or slide reservoirs or magazines J J', and at the rear of the lantern are located two transverse guide-bars K K', which latter guide-bars correspond in position with the guide-bars I I' and also form guideways for the slides. Said guide-bars I I' extend between the magazines J J' and are connected with the ends of said magazines in such manner as to receive slides from one magazine and deliver them to the other magazine, while the guide-bars K K' are similarly located and arranged, but are intended for the transfer of slides from one magazine to the other in a direction opposite to that in which they are moved in passing along the guide-bars I I'.

The magazines J J' referred to each consists of an elongated box or receptacle open at its top for the insertion of the slides and of a width and depth sufficient to receive the slides crosswise between its side walls, the slides being packed within the magazines side by side, so as to fill the same throughout their entire length. Said magazines are both of the same length and arranged at equal distances from the central or optical axis of the lantern with their ends opposite each other and in alinement with the guide-bars K K' and I I'.

In connection with the magazines thus arranged we provide carrying or shifting devices for carrying the slides from the forward end of one magazine to a point in front of the condensing-lenses and thence to the other or second magazine, and also similar shifting devices for transferring or carrying back the slides from the rear end of the second magazine to the rear end of the first magazine. In connection with such shifting devices we also provide means for thrusting or moving the slides along or through the magazines, so that they will be moved toward the delivery end of each magazine from the receiving end thereof as fast as they pass from said delivery end and are received at the receiving end.

The several devices we propose to actuate by a single driving connection or prime mover, so that without any attention on the part of the operator the slides may be moved or fed continuously from one magazine to the lantern and thence into the other magazine as long as desired.

In the operation of the device embracing these general features the slides are continually delivered from one magazine to a central point in the guides I I' and in position to receive the rays of light passing through the lenses and then carried to the opposite magazine, while at the same time slides are being simultaneously removed from the rear end of that magazine to which they are thus delivered and carried to the rear end of the other or first magazine from which they are supplied to the lantern, the parts for giving movement to the slides being so arranged that each time a slide is delivered from the feeding or supply magazine to the guides I I' a second slide is carried into the receiving-magazine, a third slide is taken out of the receiving-magazine and carried to the center of the guides K K', and a fourth is delivered from the said guides to the rear end of the feeding-magazine. It follows that in the construction described all of the slides in the two magazines will be fed to the lantern one by one if the feeding apparatus continue in operation long enough for the purpose, and that if said feeding apparatus be continually operated all of the slides will be fed to the lantern in the same order again and again as long as the device continues to be operated.

To now refer more particularly to the features of construction in the magazines and the actuating devices for the slides, these parts are constructed as follows:

In the instance illustrated the magazine J constitutes the feeding-magazine and the magazine J' the receiving-magazine, or, in other words, the slides are fed from the front end of the magazine J to the front end of the magazine J'. The devices for moving the slides consist generally of reciprocating slide-carriers, embracing gripping or pushing devices, which are movable longitudinally in the guideways and are adapted to engage the slides in such manner as to thrust or slide them along said guideways from one magazine to another.

The devices at the front and rear ends of the magazines being identical, a description of one will serve for both, and both are lettered alike in the drawings, the guides I I' J J' alone bearing different reference-letters.

Each slide-actuating device consists principally of a longitudinal sliding bar L, which rests and is guided in a groove $i^2$, formed in the lower guide-bar I' adjacent to the guide-groove $i$ thereof, said guide-bar I' being made wider than the upper guide-bar in order to contain both grooves, Fig. 1. Upper and lower horizontal end pieces M M' of the magazines constitute extensions or continuations of the guide-bars I I' and are provided with rabbets $m\ m'$, the inner parts of which are in alinement with the groove $i\ i'$ and which are adapted to receive the slides laterally from the magazine or to permit the slides to be moved sidewise from them to the magazine. The magazine itself may be constructed in any suitable manner to form a trough or channel adapted to receive the slides crosswise between its side walls. The magazines illustrated consist merely of opposite parallel side plates $j$, to the lower edges of which are attached angle-pieces $j'$, the horizontal flanges of which extend inwardly to form ledges for supporting the slides. The rectangular frame formed by the side plates $j$, the angle-pieces $j'$, and cross-bars M M' are sustained from the base-board by means of posts or uprights $M^2$ $M^2$, intermediate short posts $M^3$ being interposed between the side walls of the magazine and the posts and being supported by bracket-arms $M^4$ near the lower ends of the posts, so as to form open spaces between the uprights $M^2$ and the ends of the magazine in which the actuating devices for the slides or slide-carriers are located. The upper cross-bars M are widened at their ends and attached directly to said uprights $M^2$, as clearly seen in the plan view Fig. 3.

The longitudinally-sliding bar L, which constitutes the main part of the feeding device, is attached at its ends to cross-pieces $l\ l$, which extend downwardly therefrom and are attached to a second parallel bar L', so that the bars L L', with the upright pieces $l\ l$, constitute a rigid rectangular frame constituting the body or frame of the slide-carrier. The lower bar L' of said frame is held and guided in notches $m^2$, formed in the brackets $M^4$, Fig. 6, so as to maintain the frame referred to in a vertical position, the engagement of the upper bar L with the groove $i^2$ and the lower bar L' with the notches $m^2$ enabling the frame to slide longitudinally and in a direction at right angles to the side walls of the magazines.

Devices are provided for giving endwise reciprocatory motion to the slide-carrier, which will be hereinafter described.

The bar L is provided with two spring slide-actuating detents or catches, (indicated as a whole by N N',) one of which, N, acts to take the slides from the delivery end of one magazine and carry it to the middle of the guide-bars J J' or K K', while the other detent serves to carry the slide from its central position in said guide-bars into the receiving end of the other magazine. The detent N consists of a pivoted pawl $n$, having a pin or stud $n'$, which is acted upon by a spring $n^2$ in such manner as to throw the pawl inwardly or toward the face of the slide. Said detent N is intended to engage the rear or outer edge of the slide when within the magazine J and to carry or thrust the same along within the guide-grooves $i\ i'$ until it reaches a central position in said guide-grooves, as seen in Fig. 10. In the backward motion of the sliding bar L the pawl on coming in contact with the slide which is at the end of the magazine is thrust backward or outwardly by the inner edge of the slide which acts on the inclined rear edge or face of the pawl, and the pawl then rides over the face of the slide until the outer edge of the slide is reached, when the pawl springs forward and becomes engaged at its abrupt face with the outer edge of the slide. In this connection it may be noted that we prefer to use slides having metal or other strong frames, such as are shown, in order to avoid liability of injury to the slides by contact of the pawls therewith.

The catch or detent N', Fig. 13, is shown as made like that before described, consisting of a pivoted pawl $n^3$ and a spring $n^4$, which acts against a pin or stud $n^5$ on the pawl. The pawl is in this case adapted to engage the rear edge of a slide which has been previously moved to the center of the guide-bars I I' and to carry or thrust the same forward into the receiving end of the magazine J'.

In order to aid in centering the slide and to avoid possibility in the back stroke of the catch N' of backward shifting or retrograde movement of the slide when it rests at the center of the guide-bars, a movable stop or detent is provided which is free to move in a direction to allow the forward passage of the slide, but which drops behind the slide when the latter reaches its central position and thereby prevents retrograde movement thereof. Such catch or detent is indicated as a whole by $N^2$, Fig. 10, the same being mounted on the top guide-bar I and embracing a pawl $n^6$, which is mounted on a pivot $n^7$ and is held in a depressed position and in the path of the upper edge of the slide by a leaf-spring $n^8$. The free or lower end of said pawl $n^6$ is adapted to swing freely upward, so as to rise above the upper edge of the slide as the latter is advanced toward the center of the guide-bars, the pawl dropping behind the slide as soon as the latter reaches its central position. The slides when carried forward by the detent may in some cases be carried too far forward or past their central position in the guides, and in order to provide a means of accurately centering the slides we provide the detent N' with a projection or shoulder $n^8$, Fig. 13, which is adapted to act against or come in contact with the advance edge of the slide as the detent is moved backwardly, and thus thrust or carry it backwardly into contact with the detent $N^2$, which serves to arrest its retrograde motion when thus thrust backwardly by the detent N'. The said detents $N^2$ and N', when the latter is provided with a suitable shoulder $n^8$, thus constitute a means of accurately centering the slides in the guide-bars which support them.

To now refer to the devices for moving or thrusting forward the slides through the magazines, these parts are made as follows: A transfer plate or presser O is located at the receiving end of the magazine, which presser has a reciprocatory motion inwardly and outwardly past the path of the slides as they enter the magazine. Said presser is withdrawn on the advance of each slide to permit the same to freely enter the magazine and is then advanced to force or press all of the slides forward to take the place of one which has been removed from the delivery end of the magazine. The devices shown for actuating such presser consist of a vertical rock-shaft O', provided at a point opposite the presser with a rigid arm $o$, which is connected with the presser by a pivoted link $o'$. A leaf-spring $o^2$, attached to the link $o'$ and acting on the outer part of the presser, tends to maintain the same in an inclined position when retracted, or, in other words, to keep the presser with its outer edge advanced and its inner edge (or that at the receiving side of the magazine) retracted, so that the slides entering the magazine will not strike its edge, but will be guided inwardly or forwardly by contact with the inner surface of the presser.

The peculiar motion of the presser by which its edge which is nearest the incoming slide is withdrawn in advance of its opposite edge is of great importance, as it insures the proper entrance of the slides into the magazine, and inasmuch as the oblique position of the presser in its withdrawal may be secured otherwise than by the use of the leaf-spring described and shown it is desired to cover mechanism by which one edge of the presser is held back or retarded, so as to bring the presser into an inclined position, whether a spring or some other device is applied for this purpose. A link $o^3$, connecting the outer margin of the presser with the frame of the magazine, limits the advance movement of its said outer edge, so that the latter will be positively brought to a position at right angles to the side walls of the magazine each time it is advanced to the forward limit of its throw. Devices for actuating said rock-shaft O' will be hereinafter described. In the operation of these parts the forward motion of the slide-carrier brings the edge of the slide past and behind the advance edge of the presser and then into contact with its inside surface, which, being then inclined, acts as a guide to force the slide out of the groove of the guide-bars into position to be acted on by the advancing presser, which in its advance movement regains its normal position at right angles to the sides of the magazine. The presser as it moves forward acts with uniform pressure on the slide to carry it forward past the upper and lower spring-detents, by which latter it is held in its upright position.

$O^2$ $O^2$ indicate spring arms or detents which are secured to the frame of the magazine at the top and bottom of the receiving end thereof, Fig. 6, and which are provided with points or projections extending inwardly toward the slides to points inside of the planes of the top and bottom edges of the slides. These detents are thrust outwardly by each slide as the same is forced forward by the presser, and then fall behind the edges of the slides to prevent backward movement thereof or to prevent the same from falling into an inclined position or otherwise becoming displaced on the return of the presser. The end or rearmost slide is thus held in a position forward of the guide-grooves through which the slides enter the magazine, so that possibility of an entering slide striking the slide previously inserted is avoided. Obviously the detents referred to may be otherise located than as shown, provided they engage and hold the edges of the slides as the latter are thrust forward by the presser.

In addition to the devices described for feeding forward the slides at the receiving end of the magazine we have found it advisable to provide an auxiliary feeding device for acting on the slides at the delivery end of the magazine in order to positively carry the same into position for delivery to the guide-grooves, through which they make their exit from the magazine. Such device is clearly shown in Fig. 6, the same consisting of a longitudinally-movable rod P, which is given reciprocatory motion by means of an arm $O^3$ on the rock-shaft O' in one direction and by a spring P' attached to the base-board and acting on the rod, so as to move it backwardly and hold it in contact with the arm $O^3$. At its forward end, or that adjacent to the delivery end of the magazine, is located an auxiliary feeding device consisting of an upwardly-extending spring-arm $p$, having a thin transverse end, which is adapted to enter between the lower edges of the slides and in the advance movement of the rod P to force forward the slide in advance of it, which is engaged thereby. The spring-arm $p$ is bent or curved in U form, so as to have considerable resiliency and to spring or yield both vertically and backward and forward, so that undue pressure or strain on the slides may be avoided, while at the same time they will be properly moved or thrust forward in the magazine. A second spring-arm $p'$, forming a continuation of the rod P, acts to limit the distance to which the arm $p$ may rise or enter between the slides. Said rod P may be supported in any suitably-arranged guides, the same being herein shown as mounted in a guide-plate $p^2$, attached to one of the magazine angle-bars $j'$, and in a depending arm $p^3$, attached to the frame of the magazine at the opposite end thereof.

In the operation of the slide-shifting devices described at each backward reciprocation of one of the slide-carriers the two pawls or catches N N' each engages a slide, one of which is located at the end of the row of slides in the magazine and the other of which is located at the center of the guideways which extend between the magazines. As the carrier is advanced the slide which was in the magazine is carried to the center of the guideway, while that which was at the center of the guideway is carried within the receiving end of the other magazine, the transfer-plate O at this time being withdrawn to allow the slide to freely enter. The slide-carriers at both ends of the magazines operate at the same time, so that when a slide is taken from the delivery end of one magazine another slide is inserted in the receiving end of the same magazine. As soon as the slide-carrier has completed its forward stroke, therefore, a vacant space will have been left at the delivery end of each magazine, while a new slide will have been inserted at the receiving end thereof in front of the presser there located. After the carrier has completed its stroke the presser is then advanced, so as to move all of the slides forwardly through the magazine a distance equal to the thickness of one slide, thereby filling the space which is left by the removal of the slide and bringing a new slide in position for delivery from the magazine. The proper advance movement of the end slide is insured by the action of the yielding finger on the rod P, which carries such end slide positively into the rabbets of the top and bottom bars at the end of the magazine, and this insures the said end slide being brought into alinement with the grooves of the guide-bars notwithstanding slight variations in the thickness or irregularities in the form of the slides behind it.

To now refer to the devices illustrated for actuating the slide-feeding devices above referred to, these parts are made as follows:

Q is a vertical shaft attached to the frame of the machine below the base-board and having mounted thereon an oscillatory plate or disk Q'. Attached to this disk are two gear-segments $q\ q$.

Mounted on the machine-frame above the disk $q$ are two horizontal shafts R R, the same being shown as mounted in hangers $r\ r$, attached to the base-board of the apparatus.

R' R' indicate two gear-wheels which are attached to said shafts and intermesh with the gear-segments $q$. Through the medium of these gear-wheels oscillatory movement is given to the shafts R R. Rising from said shafts are two rigid arms $R^2 R^2$, which extend upwardly through openings in the base-board and the upper ends of which are connected by links R" with the reciprocating slide-carriers L, as clearly seen in Fig. 10. It follows from the construction described that when the disk Q is swung or oscillated about its center reciprocatory movement will be transmitted to the carriage-slides through the medium of the connecting parts above described. The gear-segments $q\ q$ are so arranged that they pass away from or leave the gear-wheels in each stroke of the disk which supports them, and in order that the gear-wheels will in all cases be in position to properly engage the gear-segment on the return stroke of the disk the gear-wheels are provided with crank-pins $r^2\ r^2$, and spring-arms $r^3\ r^3$ are attached to the disk in position to engage the said crank-pins and thereby rotate the gear-wheels sufficiently to bring them into the proper position. The object of said crank-pins and springs, therefore, is to insure that the gear shall be in proper position at the end of the motion of the disk, so that the detents on the slide-carriers will be brought with certainty into position to engage the rear edges of the slides. The slide-carriers must obviously complete their advance stroke for delivering the slides to the receiving ends of the magazines before the pressers begin to advance, and until the pressers have completed their respective strokes the slide-carriers must remain at the end of their advance movement with the detents in position to catch the slides delivered from the delivery ends of the magazines. The instant the gear-wheels pass beyond the gear-segments on the disk the slide-carriers are no longer driven; but in practice it is found that the impetus of the parts carries them farther than they are moved positively by the actuating-gears, and the slide-carriers are often thrown so far as to strike the parts at the ends of the guides, and the gears not being arranged to prevent a rebound the detents are liable to come to rest out of their proper positions and unless restored to the same will fail to engage the slides when again advanced. The springs placed on the disk beyond the racks produce the desired result of restoring the slide-carriers to their proper positions, said springs by their contact with the crank-pins placed at such place on the gear-wheels that they will stand below the level of the centers of the same when the gear-wheels leave the racks, so as to turn the wheels backward to their proper positions, or, in other words, serving to give the latter a slight rotary motion sufficient to correct the effect of the rebounding of the slides and to bring the slide-carriers into exactly the proper position for engagement of the detents with the slides.

For giving motion to the rock-shafts $O'$ the same are extended downwardly through the base-board to a point opposite the disk Q, and are there provided with arms $O^4$, which are connected with the disk by means of connections affording lost motion between the parts, such connections being herein shown as consisting of flexible strands or chains $O^5$, which are so adjusted that at each stroke or reciprocation of the disk they will be drawn taut and will give a sufficient amount of movement to the rock-shafts. For giving a reverse movement to said rock-shafts flat or leaf springs $O^6$ are attached to the under surface of the base-board in position to bear against an arm or lug $O^7$ on the rock-shaft, said springs holding the rock-shafts normally in such position as to hold the pressers O O retracted.

The disk Q may be given oscillatory movement by any preferred form of driving device—as, for instance, a hand-lever $Q^3$ may be attached to the disk for actuating the same, it being desirable in case such hand-lever is employed to provide stops $q^3$ $q^3$ to limit the movement of the hand-lever. Said stops are herein shown as having the form of pins inserted in holes formed in parallel bars $q^4$ $q^4$, located above and below the hand-lever.

In Fig. 8 we have shown a construction in which the disk Q is adapted for actuation by an electric or other motor. In this instance the shaft S is mounted on the machine-frame and is provided with a crank $s$, connected with the disk by a pitman $S'$. The shaft is provided with a belt-pulley $S^2$, over which may be trained a driving-belt from a driving-pulley actuated by an electric motor, suitable speed-reducing devices, such as a worm-gear, of course being used between the motor-armature and the driving-pulley, so as to give a proper speed to the same. The throw of the crank $s$ is made such as to give a proper extent of oscillatory movement to the disk Q, thus providing a simple and effective driving device for the feeding devices.

In connection with the slide-feeding device of the character above described we propose to employ an automatic cut-off or shutter adapted for intercepting the rays of light passing through the lenses during the time the shifting of the slides takes place, so that movement of said slides will not be visible. This device is shown in Fig. 14 and is intended to act in the space in front of the guideway for the slides. It consists principally of two oscillating shutters T T, which are movable toward and from each other in parallel planes, so as to overlap when brought together, and which are preferably provided with V-shaped notches at their adjacent edges, so that as the shutters are brought together a gradually-diminishing aperture will be formed, by which the light-rays will be gradually cut off. For operating said shutters the same are shown as mounted on two oscillating arms $T'$ $T'$, which are mounted on pivots $t$ $t$, secured to the baseboard A, and actuating devices receiving movement from the disk Q are employed to operate said arms. These actuating devices, as herein shown, are constructed as follows: One of the arms $T'$ is extended below its pivot to form a lever-arm $T^2$, with the lower end of which is connected a spring $T^3$, which draws the arm in one direction. Connected with the lever-arm $T^2$ below its pivot $t$ is an inclined connecting rod or link $t'$, which extends to the opposite arm $T'$ and is connected with the latter above its pivot, said link serving to communicate motion from one arm to the other and to give motion in opposite directions to the two arms. The spring $T^3$ acts upon the lever-arm $T^2$ in a direction to throw the arm $T'$ to which it is connected outwardly, and the other arm $T'$ is similarly thrown and held outwardly by the action of the spring, owing to its connection with the lever-arm by means of the link $t'$. For moving the shutters in a direction to close the same, or in opposition to the action of the spring $T^3$, a rock-shaft $T^4$ is mounted in a hanger $t^2$ above the disk Q, said rock-shaft being provided with a rigid arm $t^3$, adapted to engage the lever-arm $T^2$, and with another rigid arm $t^4$, which extends downwardly at the outer margin of the disk Q. Attached to said disk is an outwardly-extending cam-plate $t^5$, which in the turning of the disk is adapted to act upon and lift the arm $t^4$ of the rock-shaft and to thereby carry the arm $t^3$ thereof outwardly or in a direction to swing the lever-arm $T^2$ against the action of the springs $T^3$, and thus bring together or close the shutters. The cam-plate $t^5$ is made of such length that the arm $t^4$ will rest and slide thereon throughout the entire stroke of the disk after said arm has been engaged and lifted by the cam-plate, so that the shutters are held closed from the time the cam-plate reaches the said arm until it again leaves the same in the rearward movement or back stroke of the disk. The motions of the parts are of course so timed that the shutters will be closed just before the slide-carriers begin to move and will be again opened after the slide-carriers have completed their movement and a new slide has been brought into position for exhibition.

As a separate and further improvement we propose to make the bodies of the shutters of translucent or semitransparent material. When such shutters are used, the picture gradually disappears from periphery to center as the shutters are closed, but the screen, while blank, is still light, thereby avoiding a sudden and entire shut off of the light, which is so pronounced as to be disagreeable.

While the devices described and shown for giving movement to the slides, pressers, and shutters are practical and in many respects desirable, yet, as far as the main operative features of the device are concerned, they are not essential, and others may be substituted for them with the same general results in practice.

It is obviously practicable to locate two slide-magazines arranged and operating substantially as described one above and the other below the lantern or in an oblique line with the lantern at opposite sides thereof, and we do not, therefore, desire to be limited to slides arranged in the particular manner shown except in connection with the claims on features which are applicable only to the specific arrangement of the magazines which is herein illustrated.

We claim as our invention—

1. The combination, with objective lenses consisting of two elements which are fixed relatively to each other, of condensing-lenses, and a double-convex lens interposed between the objective and condensing lenses, said objective lenses and the double-convex lens being adjustable relatively to each other and to the condensing-lenses, substantially as described.

2. The combination, with objective lenses consisting of two elements which are fixed relatively to each other, of condensing-lenses, a double-convex lens located between and adjustable relatively to the condensing and object lenses, and endwise expansible and contractible tubular inclosures located between the objective lenses and the double-convex lens and between the double-convex lens and the condensing-lenses, substantially as described.

3. The combination, with an object-lens tube, condensing-lenses, and a slide-support, of a double-convex magnifying-lens located between the object-lens tube and the slide-support, said magnifying-lens being adjustable relatively to the condensing and object lenses, and a tubular inclosure, consisting of bellows-sections extending between the slide-support and the magnifying-lens and between said magnifying-lens and the object-lenses, substantially as described.

4. An optical projecting apparatus, comprising a lamp or source of light, condensing-lenses, object-lenses consisting of two elements fixed relatively to each other, an intermediate slide-support, a double-convex lens located between and adjustable relatively to the slide-support and the object-lenses, endwise expansible and contractible tubular inclosures between said magnifying-lens and the condensing and object lenses, a screen of semitransparent or translucent material supported opposite the object-lenses and near the latter, and a housing or inclosure extending from the tube of the object-lens to the margins of the screen, substantially as described.

5. The combination with a magic lantern, of two magazines for holding picture-slides located at opposite sides of the lantern and extending to the rear of the illuminating devices thereof, means at the forward ends of the magazines for feeding the slides from one magazine to the other in a path intersecting the optical axis of the lantern, and means at the rear ends of the magazines for transferring the pictures back from the receiving to the delivery magazine, substantially as described.

6. The combination with the lenses and the illuminating device of a magic lantern, of two magazines located at opposite sides of the illuminating device, guideways connecting both ends of the magazines, one of said guideways constituting the slide-holder of the lantern and the other being located at the rear of the illuminating device, and means for transferring the slides from one magazine to the other at both the front and rear ends of the magazines, substantially as described.

7. The combination with a magic lantern, of two magazines, one located at each side of the same, guideways connecting the magazines with each other at both ends of the magazines, one of said guideways constituting the slide-holder of the lantern and the other being located at the rear of the lantern, and reciprocating slide-carriers moving in the guideways at both ends of the magazines, substantially as described.

8. The combination, with a magic lantern, of two magazines, at opposite sides of the said lantern and extending to the rear of the illuminating device thereof, of a guideway connecting the magazines, and forming the slide-holder of the lantern and a reciprocating slide-carrier, the stroke of which is one-half the distance between the magazines, whereby one slide is carried from one magazine to a point in the optical axis of the lantern, and another slide from the same point to the other magazine at each stroke of the slide-carrier, substantially as described.

9. The combination, with a magic lantern, of two magazines, located at opposite sides of the lantern and extending past the rear end of the same, guideways at both ends of said magazines, means for transferring the slides from one magazine to the other at both ends of the same, and means for moving the slides longitudinally through the magazines, substantially as described.

10. The combination with a magic lantern, of two magazines located at opposite sides of the lantern and extending past the rear end of the same, guideways connecting said magazines at both ends, means for transferring the slides from one magazine to the other at both ends thereof, and means for moving the slides longitudinally through the magazines comprising pressers movable in a direction endwise of the magazines and means for giving reciprocatory motion to said pressers, substantially as described.

11. The combination, with a magazine and means for delivering slides thereto, of a reciprocating presser having the form of a flat plate, and which is movable in a direction endwise of the magazine for thrusting the slides forward through the magazines, and means for actuating the presser constructed to retract one edge of the presser in advance of the other edge, whereby the presser is held in an inclined position to guide the incoming slides, substantially as described.

12. The combination with a magazine for lantern-slides and transverse guideways at the receiving end thereof, of a presser having the form of a flat plate and which is movable in a direction endwise of the magazine, means for giving reciprocatory motion to the presser having pivotal connection with said presser, and a spring applied between the presser and its actuating devices to yieldingly hold the presser in an inclined position when retracted.

13. The combination, with a magazine and guideways at the receiving end thereof, of a reciprocating presser, a rock-shaft provided with a rigid arm, a link connecting the arm with the presser, and a spring attached to the link and acting on the presser to throw the same into an inclined position, substantially as described.

14. The combination, with a magazine and a reciprocating presser, of means for actuating the presser comprising a spring applied to hold the presser in an inclined position when retracted, and a link connecting the presser with the frame of the magazine to restore the presser to its parallel position when advanced, substantially as described.

15. The combination, with a magazine and guideways at the receiving end of the magazine, of a reciprocating presser, means applied to the presser for throwing it into an inclined position when retracted, and spring-detents on the magazine for holding the slides when thrust forward by the presser, substantially as described.

16. The combination, with a magazine and receiving and delivery guideways connected with opposite ends of the magazine, of a presser at the receiving end of the magazine movable endwise of the magazine for advancing the slides through the same, means for giving reciprocatory motion to the said presser in a direction lengthwise of the magazine and spring-detents located at the receiving end of the magazine adapted to engage the entering slides and hold the same from backward movement after they have been moved forward by the presser, substantially as described.

17. The combination, with a magazine, of feeding and delivery guideways at both ends of said magazine, means for moving the slides longitudinally through the magazines comprising reciprocating pressers, and an auxiliary feeding device for the delivery end of the magazines comprising a reciprocating spring-finger adapted to engage the margins of the slides, substantially as described.

18. The combination, with a magazine and a presser for moving the slides longitudinally through the magazine and an auxiliary feeding device at the delivery end of the magazine consisting of a longitudinally-movable rod carrying a spring-finger, and means for actuating the presser and spring-finger comprising an upright rock-shaft provided with an arm acting on said rod, and a spring for holding the rod against the arm, substantially as described.

19. The combination with two magazines, of guideways connecting said magazines at both ends of the magazines, carrying devices for transferring slides from one magazine to the other at both ends of the magazine, pressers having a reciprocatory movement endwise of the magazines for carrying the slides longitudinally through the same, and actuating means connected with the slide-carriers and also with the pressers for giving reciprocatory motion to said parts, substantially as described.

20. The combination, with two magazines, of guideways connecting said magazines at both ends of the magazines, devices for transferring the slides from one magazine to the other at both ends of the magazines, reciprocating pressers for carrying the slides longitudinally through the magazines, and actuating devices for the slide-carriers, embracing an oscillating disk, and connections between said oscillating disk and the carriers consisting of gear-segments on the disk, rock-shafts having gear-wheels intermeshing with the gear-segments and crank-arms on the rock-shafts connected with said carriers, substantially as described.

21. The combination, with two magazines, guideways connecting the magazines at their opposite ends, reciprocating slide-carriers, reciprocating pressers, an oscillating disk through which motion is given both to the slide-carriers and pressers, and means for transmitting motion to the pressers comprising rock-shafts having two rigid arms one connected with the presser and the other with the disk, the connection with said disk being by means of connecting devices affording lost motion between the parts, substantially as described.

22. A feeding device for magic-lantern slides, comprising a magazine, a reciprocating presser, an oscillating disk through which motion is given to the presser, and means for transferring motion from the disk to the presser comprising a rock-shaft provided with three arms, means connecting one of said arms with the presser, a chain connecting another of said arms with the disk, and a spring acting on the third arm to hold the presser retracted, substantially as described.

23. The combination, with a magazine, of a reciprocating presser and an auxiliary feeding-finger at the delivery end of the magazine, and means for actuating said parts comprising an oscillating disk, a rock-shaft provided with four arms, means connecting one of said arms with the presser, a chain connecting another of said arms with the disk, a spring acting on the third arm to hold the presser retracted, and a rod extending from the fourth arm to the feeding-finger for actuating the latter, substantially as described.

24. A cut-off device, comprising two shutters mounted on oscillating arms, a link connected with said arms at opposite sides of the pivots thereof, a lever-arm to move the shutters in one direction, and an oscillating arm acting on said lever-arm to move the shutters in the opposite direction, substantially as described.

25. A cut-off device, comprising two shutters mounted on oscillating arms, a link connected with said arms at opposite sides of the pivots thereof, a lever-arm attached to one of said arms, a spring acting on said lever-arm to move the shutters in one direction, a cam-arm acting on the said lever-arm to move the shutters in the opposite direction, an oscillating actuating member, as the disk Q, provided with a cam-plate, and a rock-shaft having two arms, one of which acts on said cam-plate, and the other against said lever-arm, substantially as described.

In testimony that we claim the foregoing as our invention we affix our signatures in presence of two witnesses.

WILLIAM M. GREEN.
FRED W. SMITH.

Witnesses:
DAVID A. McCOY,
SAMUEL F. LEONARD.